US011342822B2

United States Patent
Miyashita et al.

(10) Patent No.: US 11,342,822 B2
(45) Date of Patent: May 24, 2022

(54) APPARATUS AND METHOD FOR BENDING

(71) Applicant: HONDA MOTOR CO., LTD., Tokyo (JP)

(72) Inventors: Keita Miyashita, Tochigi (JP); Kazuaki Ushiku, Tochigi (JP); Shinsuke Onishi, Tochigi (JP); Hideki Shigematsu, Tochigi (JP); Takumi Fukaura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/360,292

(22) Filed: Mar. 21, 2019

(65) Prior Publication Data
US 2019/0296620 A1 Sep. 26, 2019

(30) Foreign Application Priority Data

Mar. 26, 2018 (JP) .............................. JP2018-058245

(51) Int. Cl.
*H02K 15/04* (2006.01)
*H02K 3/12* (2006.01)
*B21D 7/04* (2006.01)

(52) U.S. Cl.
CPC ........... *H02K 15/0428* (2013.01); *H02K 3/12* (2013.01); *B21D 7/04* (2013.01)

(58) Field of Classification Search
CPC .. H02K 15/0428; H02K 3/12; H02K 15/0414; H02K 15/04; H02K 1/16; B21D 7/04
See application file for complete search history.

(56) References Cited

U.S. PATENT DOCUMENTS

| 2007/0040302 | A1* | 2/2007 | Schumacher | H02K 15/0421 264/297.5 |
| 2010/0251796 | A1* | 10/2010 | Akimoto | H02K 15/0421 72/475 |
| 2010/0252139 | A1* | 10/2010 | Akimoto | H02K 15/0478 29/596 |
| 2012/0200190 | A1* | 8/2012 | Matsuoka | H02K 15/0087 310/179 |
| 2014/0223727 | A1* | 8/2014 | Watanabe | H02K 3/12 29/602.1 |
| 2014/0339948 | A1* | 11/2014 | Matsuoka | H02K 3/28 310/198 |

(Continued)

FOREIGN PATENT DOCUMENTS

JP 3894004 12/2006
WO WO-2017057036 A1 * 4/2017 ........... H02K 15/065

*Primary Examiner* — Peter Dungba Vo
*Assistant Examiner* — Jose K Abraham
(74) *Attorney, Agent, or Firm* — Rankin, Hill & Clark LLP

(57) ABSTRACT

A bending apparatus (10) includes an upper first die (11), an upper second die (12), a lower die (13), a control unit (20), an upper first moving mechanism (21), an upper second moving mechanism (22), a lower moving mechanism (23), a holding die (31), and a moving and rotating mechanism (32). The lower die (13) is moved in an upper direction after the upper first die (11) and the upper second die (12) are moved to the front, whereby four coil segments (4) are bent. When the upper second die (12) is moved to a first withdrawal position in the rear direction after the four coil segments (4) are bent, a working space for the holding die (31) is ensured.

7 Claims, 13 Drawing Sheets

(56) References Cited

U.S. PATENT DOCUMENTS

| | | | |
|---|---|---|---|
| 2015/0352619 A1* | 12/2015 | Yogo | B21D 7/12 |
| | | | 72/296 |
| 2015/0372573 A1* | 12/2015 | Hashimoto | H02K 3/12 |
| | | | 29/596 |
| 2019/0074753 A1* | 3/2019 | Hashimoto | H02K 15/065 |

* cited by examiner

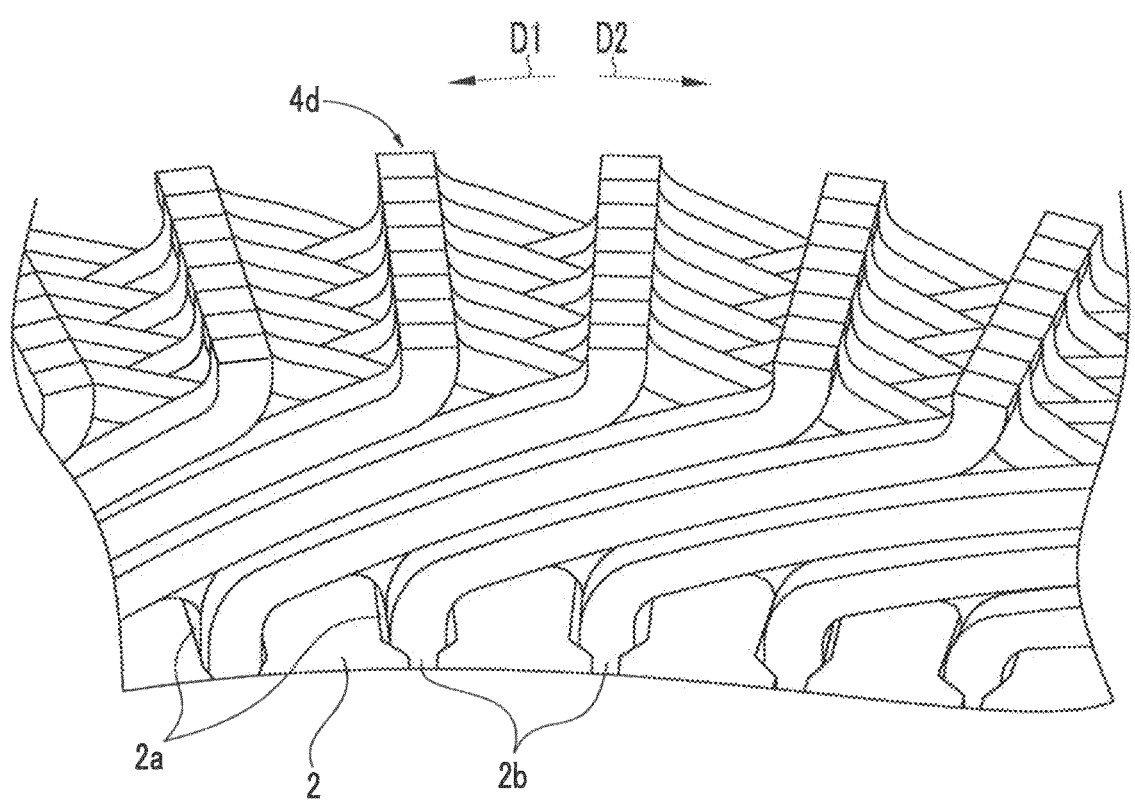

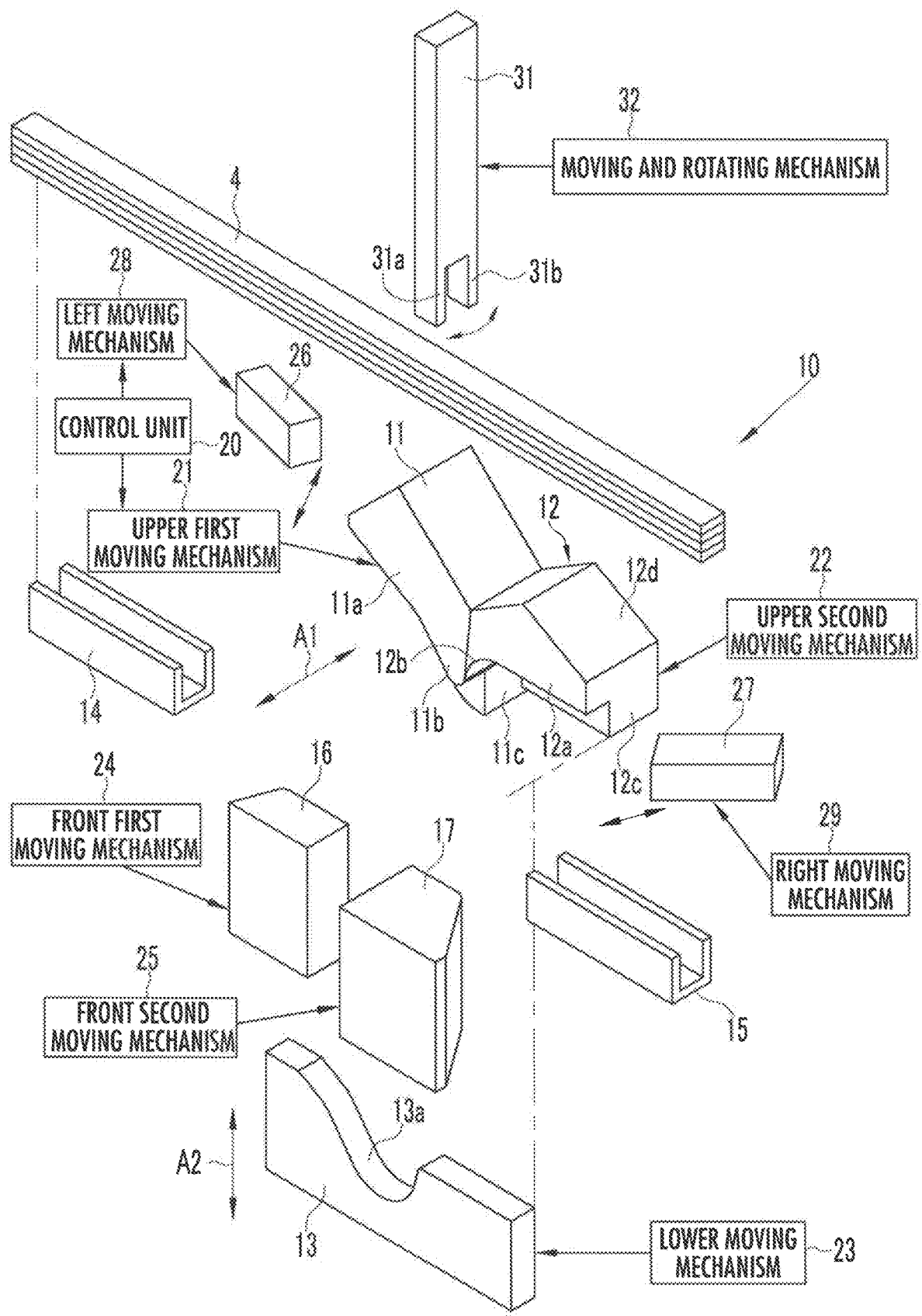

APPARATUS AND METHOD FOR BENDING

BACKGROUND OF THE INVENTION

Field of the Invention

The present invention relates to an apparatus and method for bending a workpiece.

Description of the Related Art

An electric rotary machine such as a motor or a generator comprises a stator having a cylindrical shape and a rotor disposed rotatably inside the stator.

Leg portions of U-shaped coil segments are passed through slots provided in a stator core of the stator. Each of these U-shaped coil segments comprises a pair of leg portions and a connecting portion configured to connect the pair of leg portions together, and the connecting portion is bent into an S-shape. When forming the coil segment having such a shape, a straight-line coil segment is bent by a bending apparatus (for example, Japanese Patent Publication No. 3894004).

In the bending apparatus described in Japanese Patent Publication No. 3894004, a coil segment is held by an upper die and a lower die, which move in a up-and-down direction, so that a connecting portion is bent into an S-shape. Then, in the following step, to form a pair of leg portions, both end portions of the coil segment are bent using a bending die. A portion of the bending apparatus where both the end portions of the coil segment are bent by the bending die is a portion where the upper die is positioned when forming the connecting portion, and when bending both the end portions of the coil segment by the bending die, the upper die needs to be moved in an upward direction to be withdrawn from a working space of the bending die.

To withdraw the upper die from the working space of the bending die, the upper die needs to be moved in the upward direction to such an extent as to exceed a vertical span of the working space of the bending die, and this increases the size of the bending apparatus.

Although it is considered that the step of bending both the end portions of the coil segment using the bending die is executed by a separate bending apparatus, this also increases the size of the bending apparatus.

The present invention has been made in view of these situations, and an object of the present invention is to provide an apparatus and method for bending which can realize a reduction in size of the apparatus.

SUMMARY OF THE INVENTION

According to an aspect of the invention, there is provided an electric conductor bending apparatus for bending an elongated electric conductor on a longitudinal lateral surface, including: an upper die provided to move in a direction parallel to an upper surface of the electric conductor above the electric conductor, a lower die provided to move in an up-and-down direction parallel to the lateral surface below the electric conductor and configured to hold the electric conductor between the upper die and itself to bend the electric conductor, an upper moving mechanism configured to move the upper die in the direction parallel to the upper surface between a corresponding position where the upper die corresponds in position to the lower die and a first withdrawal position where the upper die does not correspond in position to the lower die; a lower moving mechanism configured to move the lower die in the up-and-down direction between a bending position where the lower die holds the electric conductor between the upper die located in the corresponding position and itself to bend the electric conductor and a second withdrawal position where the lower die is withdrawn downwards from the bending position; and a control unit configured to control to drive the upper moving mechanism and the lower moving mechanism, wherein the control unit executes a bending control in which with the upper die located in the corresponding position, the control unit drives the lower moving mechanism to move the lower die from the second withdrawal position to the bending position where the electric conductor is held between the upper die and the lower die to be bent.

According to the electric conductor bending apparatus of the present invention, the working space for executing the following step (the bending step, the conveying step or the like) on the bent electric conductor is ensured by moving the upper die in either (for example, in a rear direction) of directions (for example, in front-and-rear directions) parallel to the upper surface of the electric conductor. This can reduce the size of the bending apparatus compared with a case where the working space is ensured by moving the upper die obliquely upwards.

A plurality of the electric conductors are preferably bent altogether at one time by the upper die and the lower die.

According to this configuration, a cycle time can be reduced when compared with a case where electric conductors are bent one by one.

The electric conductor bending apparatus preferably includes a positioning die configured to be brought into abutment with the upper surface of the electric conductor to position the electric conductor.

According to this configuration, even when the upper die moves to the first withdrawal position, the upper surface of the electric conductor can be positioned by the upper positioning die.

An upper projecting portion is preferably formed on an upper surface of the upper die, the upper projecting portion projecting in a sloping direction with respect to an upward direction.

According to this configuration, even when a load is applied obliquely to the upper die during the bending work, the bending load can be borne by a lateral surface of the upper projecting portion of the upper die, and therefore, the upper die can withstand the bending load when compared with a case where the upper surface of the upper die is flat.

The electric conductor bending apparatus preferably includes: an end portion bending die provided to move in a direction parallel to the upper surface of the electric conductor and configured to bend both end portions of the electric conductor on a plane parallel to the upper surface of the electric conductor, and an upper bending die provided to move in the up-and-down direction above the electric conductor and configured to bend a predetermined portion of the electric conductor which is covered by the upper die when the upper die is located in the corresponding position.

According to this configuration, since the electric conductor can be bent into a U-shape having a pair of leg portions and a connecting portion which connects the pair of leg portions together, and further, the connecting portion can be bent into an S-shape, a coil segment can be formed for use in a stator of an electric rotary machine.

According to another aspect of the present invention, there is provided an electric conductor bending method for bending an elongated electric conductor by holding the electric conductor between an upper die provided to move in a direction parallel to an upper surface of the electric conductor above the electric conductor and a lower die provided to move in an up-and-down direction parallel to a longitudinal lateral surface of the electric conductor below the electric conductor, the electric conductor bending method including: a step of moving to a corresponding position of moving the upper die to the corresponding position where the upper die corresponds in position to the lower die; a first bending step of moving the lower die to a bending position where the lower die holds the electric conductor between the upper die located in the corresponding position and itself to bend the electric conductor, the first bending step being executed after the step of moving to a corresponding position; and a step of moving to a withdrawal position of moving the upper die to a withdrawal position where the upper die does not correspond in position to the lower die, the step of moving to a withdrawal position being executed after the first bending step.

According to the electric conductor bending apparatus of the present invention, the working space for executing the following step (the bending step, the conveying step or the like) on the bent electric conductor can be ensured by moving the upper die in either (for example, in a rear direction) of directions (for example, in front-and-rear directions) parallel to the upper surface of the electric conductor. This can reduce the size of the bending apparatus compared with a case where the working space is ensured by moving the upper die obliquely upwards.

In the electric conductor bending method, a plurality of the electric conductors are preferably bent altogether at one time.

According to this configuration, a cycle time can be reduced when compared with a case where electric conductors are bent one by one.

The electric conductor bending method preferably includes: a second bending step of bending both end portions of the electric conductor on a plane parallel to an upper surface of the electric conductor by an end portion bending die provided to move in a direction parallel to the upper surface of the electric conductor, the second bending step being executed between the first bending step and the step of moving to a withdrawal position; and a third bending step of bending a predetermined portion of the electric conductor which is covered by the upper die when the upper die is located in the corresponding position by an upper bending die provided to move in the up-and-down direction above the electric conductor, the third bending step being executed after the step of moving to a withdrawal position.

According to this configuration, the electric conductor can be bent into a U-shape having a pair of leg portions and a connecting portion which connects the pair of leg portions together by the second bending step. Additionally, the connecting portion can be bent into an S-shape by the first bending step and the third bending step. This can form a coil segment for use in a stator of an electric rotary machine.

The upper surface of the electric conductor is preferably positioned by a separate positioning die from the upper die.

According to this configuration, even when the upper die moves to the first withdrawal position, the upper surface of the electric conductor can be positioned by the upper positioning die.

BRIEF DESCRIPTION OF THE DRAWINGS

FIG. 4A is a perspective view illustrating projecting portions of the coil segments;

FIG. 5 is a perspective view illustrating the bending apparatus;

DETAILED DESCRIPTION OF THE PREFERRED EMBODIMENT

Hereinafter, referring to drawings, an embodiment of the present invention will be described.

Firstly, an example of the structure of an electric rotary machine having coil segments bent by a bending apparatus of the present invention will be described.

Figure 1:
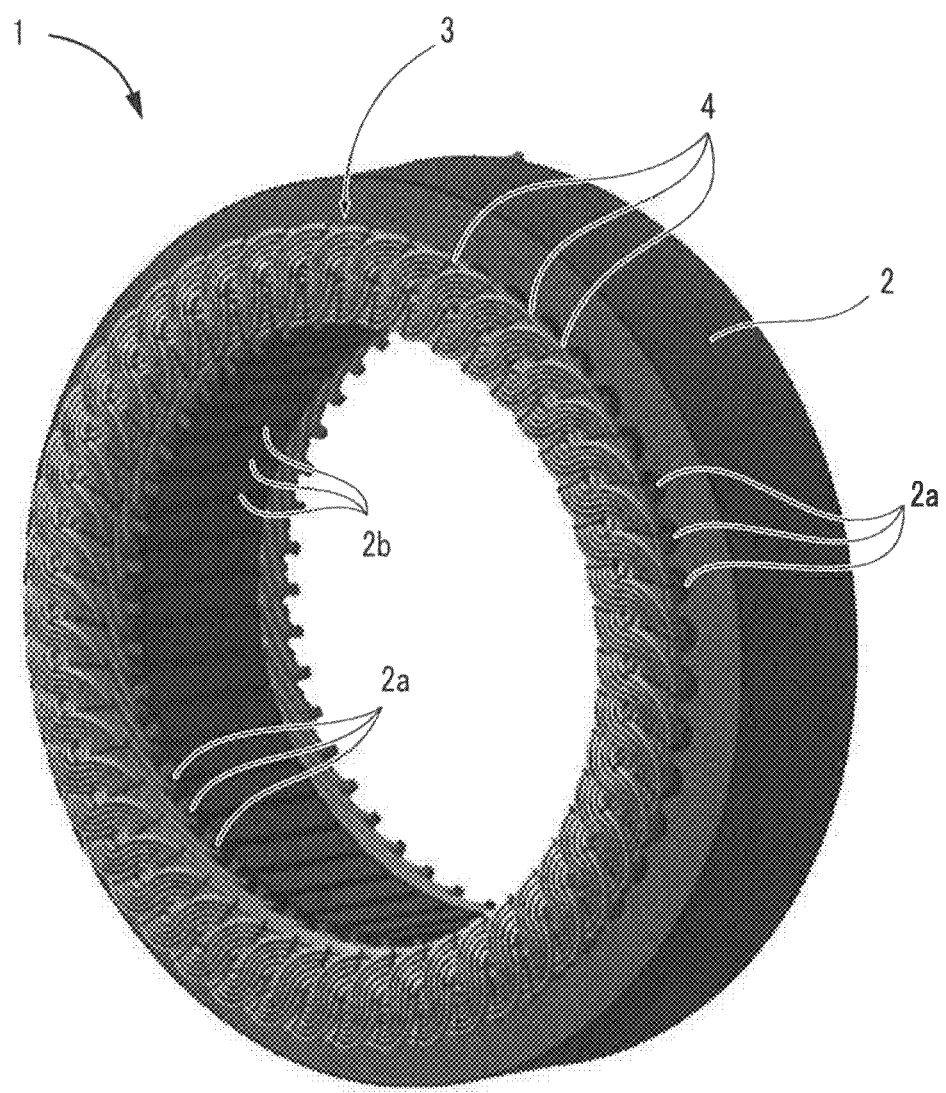
FIG. 1 is a perspective view illustrating a stator of an electric rotary machine which is bent by a bending apparatus of the prevent invention.
Figure 2:
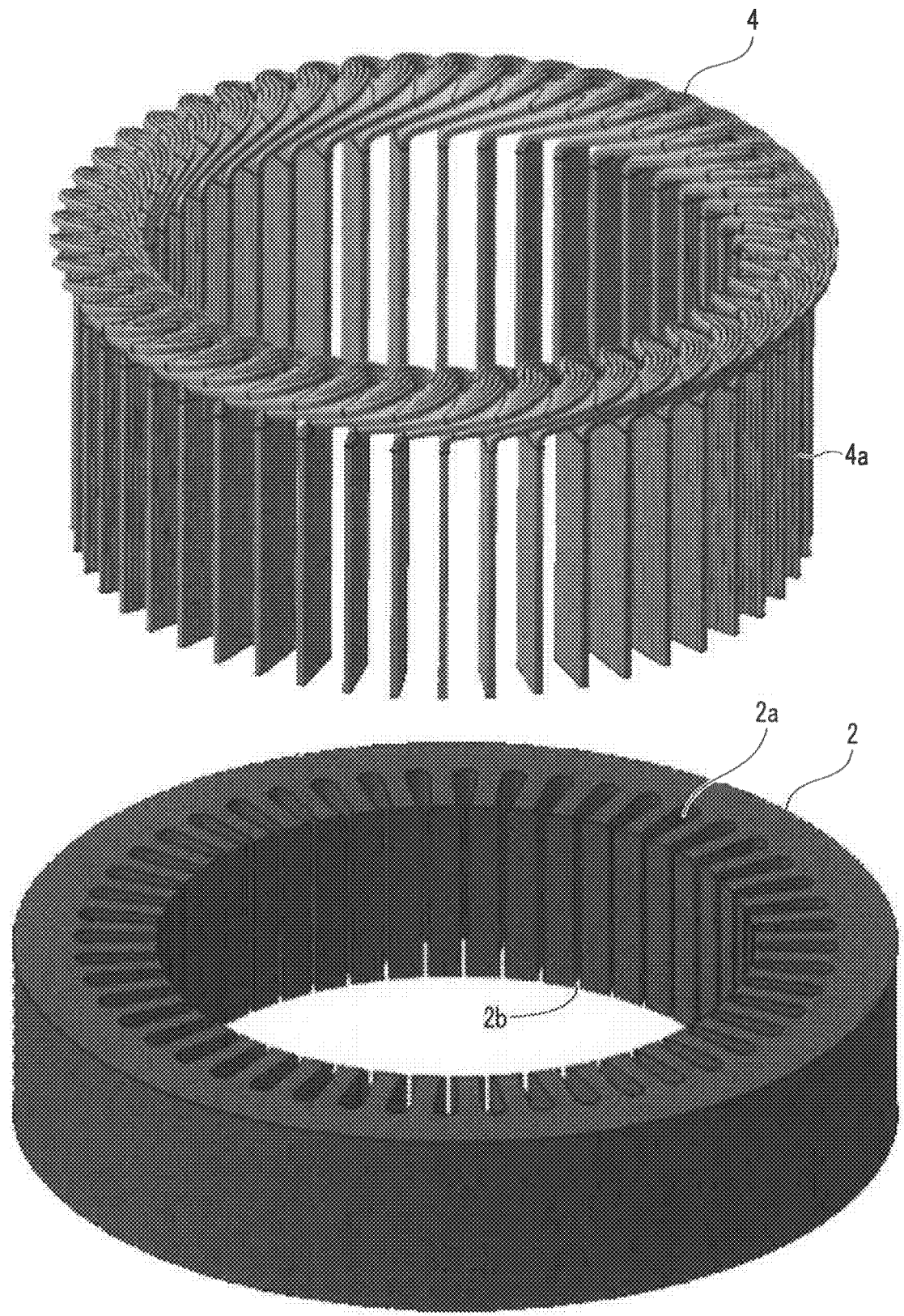
FIG. 2 is a perspective view illustrating a stator core and coil segments.

As illustrated in FIG. 1, an electric rotary machine such as a motor or a generator comprises a stator 1 having a cylindrical shape and a rotor (not shown) disposed rotatably inside the stator 1.

The stator 1 comprises a stator core 2 and a coil 3. The stator core 2 has a cylindrical shape, and a plurality of slots 2a are provided in the stator core 2 at regular intervals in a circumferential direction in such a manner as to penetrate the slot 2a in a rotational axis direction. In a radially sectional view of the stator core 2, each slot 2a is formed to extend radially outwards from a center side of the stator core 2 and communicates with an inner circumferential surface of the stator core 2 via a slit 2b formed in the stator core 2.

Figure 3:
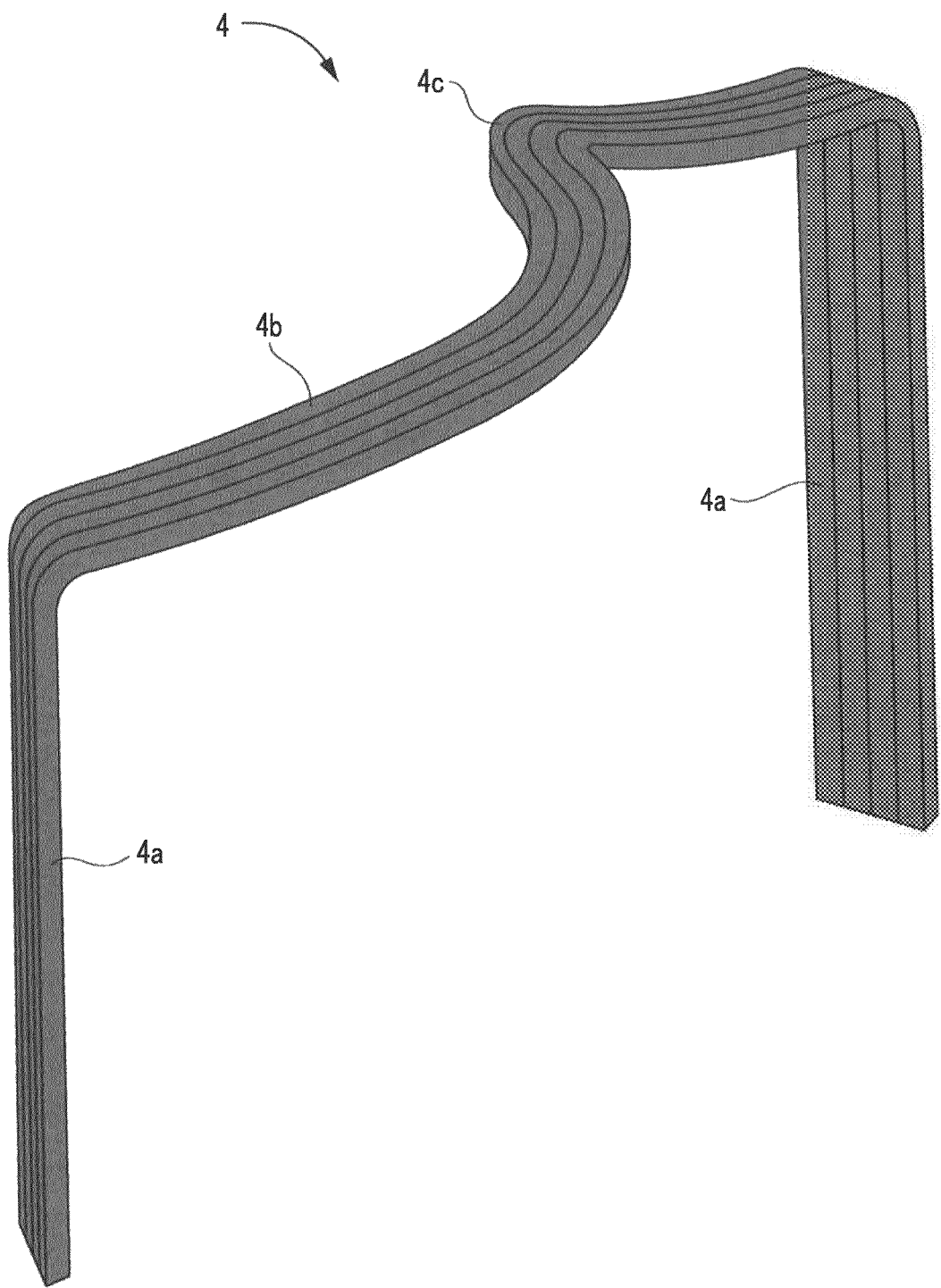
FIG. 3 is a perspective view illustrating the coil segment.

The coil 3 is formed by inserting a coil segment 4 illustrated in FIG. 3 into the slots 2a from one side of the slots 2a, bending projecting portions 4d of the coil segment 4 which project from the other side of the slots 2a in the circumferential direction, and welding the bent projecting portions 4d together.

The coil segment 4 is made up of a plurality of, or in this embodiment, four conductors (flat-type conductors) each having a rectangular cross section. The four conductors are aligned into a bundle in such a manner that wide surfaces of the conductors face one another, and the resulting bundle of conductors is formed into a U-shape. The coil segment 4 comprises a pair of leg portions 4a, 4a and a head portion 4b which connects together ends (upper ends in the figure) of both the leg portions 4a, 4a.

The coil segment 4 should be a bundle of a plurality of flat-type conductors which are aligned in a width direction and may be a stack of a plurality of flat-type conductors which are aligned in such a manner that narrow surfaces of the flat-type conductors face one another.

An S-shaped portion 4c is formed at a center of the head portion 4b in such a manner as to be curved into an S-shape in the direction in which the flat-type conductors are aligned. The head portion 4b slopes downwards from the center thereof (a center of the S-shaped portion 4c) towards both the leg portions 4a, 4a. The leg portions 4a of the coil segment 4 are inserted into the corresponding slots 2a from one side of the slots 2a. The leg portions 4a of the coil segment 4 project from the other side of the slots 2a.

The projecting portions 4d of the leg portion 4a which project from the other side of the slots 2a are bent in the circumferential direction of the stator 1 by a bending apparatus (not shown) as illustrated in FIG. 4A, and distal ends 4e of the projecting portions 4d are welded together with distal ends 4e of the corresponding projecting portions 4d by a welding device (not shown). In this way, the stator 1 is completed in which eight layers of coil segments 4 (eight coil segments 4) are disposed to be stacked together in the radial direction. Here, the eight layers of coil segments 4 are aligned sequentially in the order of a first layer, a second layer, . . . , and an eighth layer from a radially outer side to a radially inner side of the stator 1.

Figure 4B:
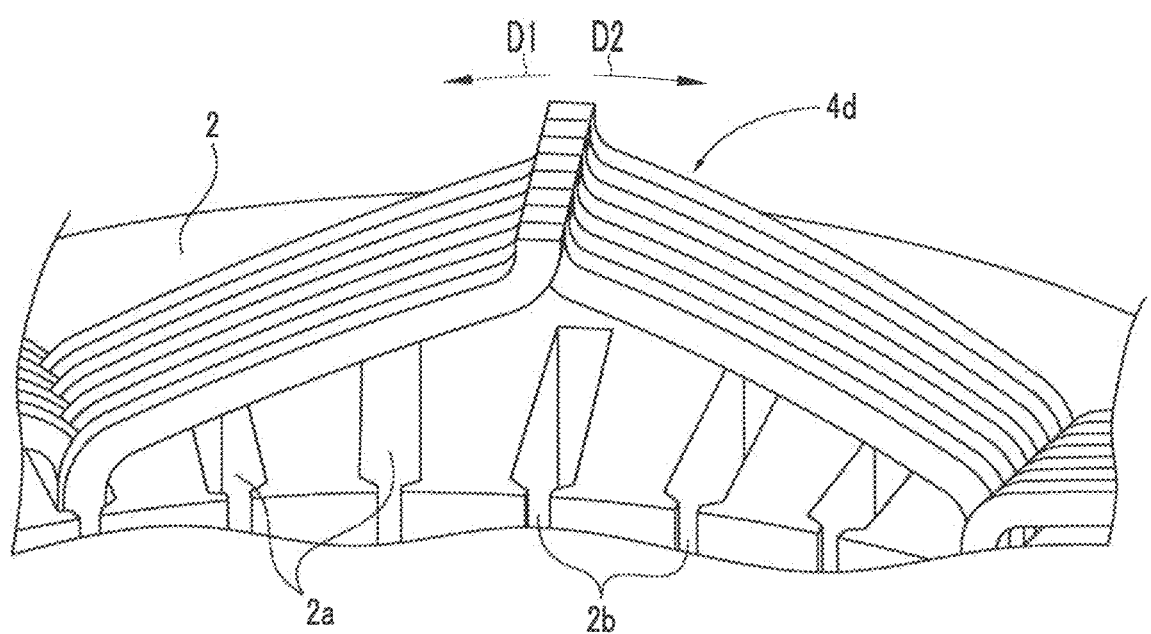
FIG. 4B is a perspective view illustrating the projecting portions of the coil segments.

The coil 3 of this embodiment is a three-phase coil of a U-phase, a V-phase, and a W-phase, and the leg portions 4a of the coil segments 4 inserted in the slots 2a are aligned in the order of U-phase, U-phase, V-phase, V-phase, W-phase, W-phase in the circumferential direction. FIG. 4B illustrates only a coil of one phase (for example, a U-phase) in the three phases.

[Bending Apparatus]

As illustrated in FIG. 5, a bending apparatus 10 comprises an upper first die 11 (an upper positioning die), an upper second die 12 (an upper die), a lower die 13, and a left receiving member 14 and a right receiving member 15 which are configured to receive a plurality of (for example, four) coil segments 4.

The bending apparatus 10 also comprises a front first die 16 and a front second die 17 which are configured to be brought into abutment with front surfaces of the four coil segments 4. As will be described in detail later, the bending apparatus 10 bends the coil segments 4 (the electric conductors) on their lateral (longitudinal) surfaces (the front surfaces) of the coil segments 4.

The upper first die 11 and the upper second die 12 are provided so as to move in a front-and-rear direction A1 (a direction parallel to an upper surface of the electric conductor), and the lower die 13, the front first die 16 and the front second die 17 are provided so as to move in an up-and-down direction A2.

The upper first die 11 comprises a sloping portion 11a which slopes in a left-and-right direction, a first arc projecting portion 11b having an arc shape, and a first holding portion 11c having a projecting shape which is configured to hold the four coil segments 4 between the front first die 16 and itself.

The upper second die 12 comprises a straight-line portion 12a which extends into a straight line in the left-and-right direction, a second arc projecting portion 12b having an arc shape, a second holding portion 12c having a projecting shape which is configured to hold the four coil segments 4 between the front second die 17 and itself, and an upper projecting portion 12d which projects upwards into an angular shape. The second arc projecting portion 12b is formed so as to continue to the first arc projecting portion 11b. The upper projecting portion 12d is formed into an angular shape (a triangular shape) of which left and right lateral surfaces extend in a sloping direction with respect to an upward direction. The shapes of the upper first die 11 and the upper second die 12 can be modified as required.

The lower die 13 comprises an arc recess portion 13a having an arc shape which corresponds to the first arc projecting portion 11b and the second arc projecting portion 12b.

The bending apparatus 10 comprises a control unit 20 configured to control the bending apparatus 10 in a supervisory fashion, an upper first moving mechanism 21 configured to move the upper first die 11 in the front-and-rear direction A1, an upper second moving mechanism 22 (an upper moving mechanism) configured to move the upper second die 12 in the front-and-rear direction A1, and a lower moving mechanism 23 configured to move the lower die 13 in the up-and-down direction A2.

The upper second moving mechanism 22 moves the upper second die 12 in the front-and-rear direction A1 (a direction intersecting the lateral surfaces (the front surfaces) of the coil segments 4 at right angles) between a corresponding position (refer to FIGS. 7 to 9) where the upper second die 12 correspond in position to the lower die 13 and a first withdrawal position (refer to FIGS. 5, 6, 10 and 11) where the upper second die 12 does not correspond in position to the lower die 13.

The lower moving mechanism 23 moves the lower die 13 in the up-and-down direction A2 between a bending position (refer to FIGS. 8 and 9) where the lower die 13 holds the four coil segments 4 between the upper second die 12 located in the corresponding position and itself and bends them and a second withdrawal position (refer to FIGS. 5 to 7, 10 and 11) where the lower die 13 is withdrawn downwards from the bending position.

The bending apparatus 10 comprises a front first moving mechanism 24 configured to move the front first die 16 in the up-and-down direction A2 and a front second moving mechanism 25 configured to move the front second die 17 in the up-and-down direction A2. The individual moving mechanisms 21 to 25 are controlled to be driven by the control unit 20.

The bending apparatus 10 comprises a left die 26 (an end portion bending die) configured to bend a left-side portion of the four coil segments 4 to the front, a right die 27 (an end portion bending die) configured to bend a right-side portion of the four coil segments 4 to the front, a left moving mechanism 28 configured to move the left die 26, and a right moving mechanism 29 configured to move the right die 27. The left moving mechanism 28 and the right moving mechanism 29 are controlled to be driven by the control unit 20.

The bending apparatus 10 comprises a holding die 31 (an upper bending die) configured to hold the right-side portion of the four coil segments 4 and bend the right-side portion to the front and a moving and rotating mechanism 32 configured to move the holding die 31 in the up-and-down direction A2 and rotate the holding die 31 about the up-and-down direction A2 as a rotational center. Although the configurations of the individual moving mechanisms 21 to 25, 28, 29, 32 can be modified as required, in this embodiment, these moving mechanisms include motors and gears.

The holding die 31 comprises a first holding portion 31*a* and a second holding portion 31*b* and holds the right-side portion of the four coil segments 4 between the first holding portion 31*a* and the second holding portion 31*b*. The moving and rotating mechanism 32 is controlled to be driven by the control unit 20.

[Bending Work]

When the four coil segments 4 are bent by the bending apparatus 10, firstly, the control unit 20 drives the moving mechanisms 21 to 23 to position the upper first die 11, the upper second die 12, and the lower die 13 in initial positions illustrated in FIG. 5. In their initial positions, the upper first die 11 and the upper second die 12 are withdrawn to the rear from the corresponding position where the upper first and second dies correspond in position to the lower die 13.

Figure 6:
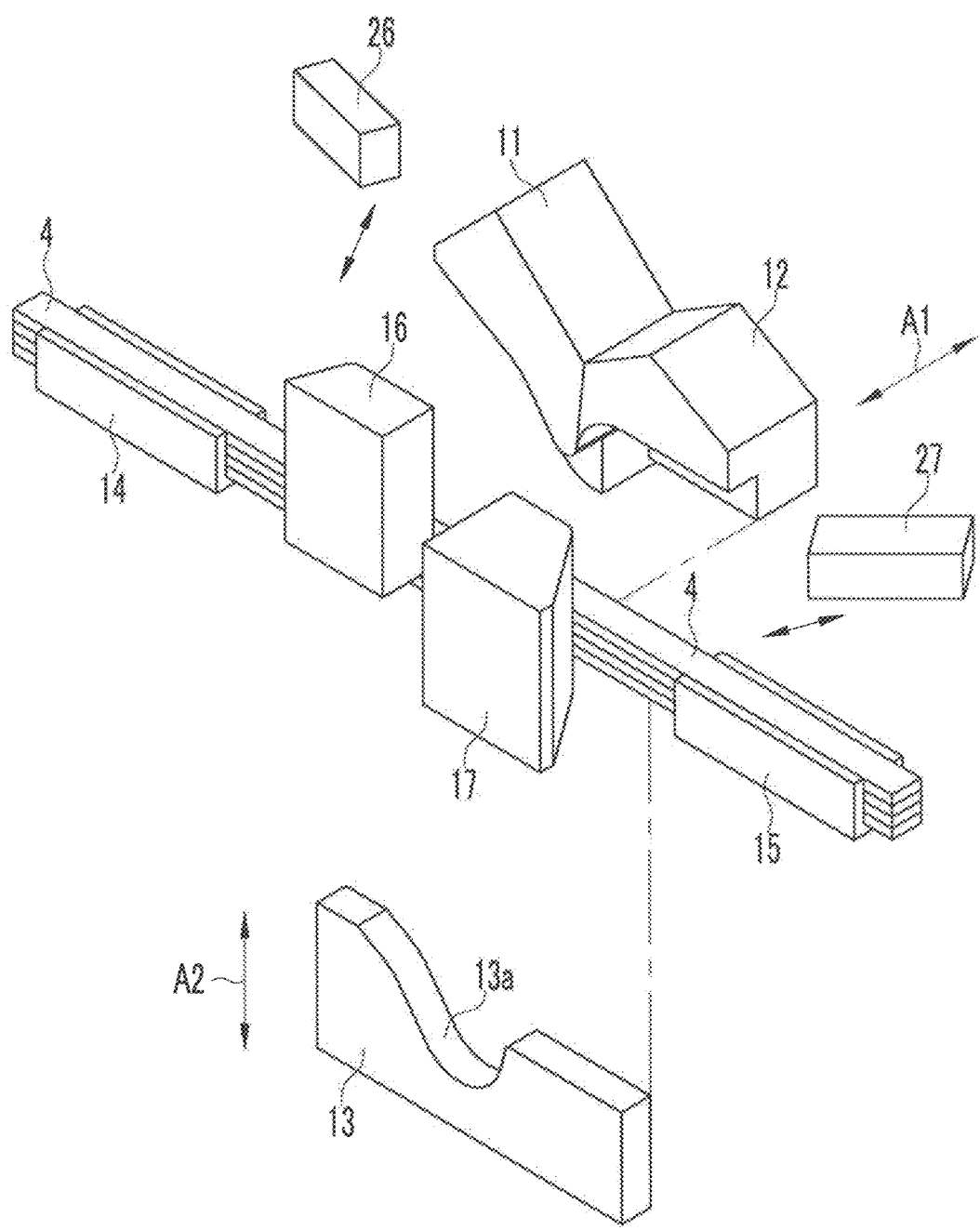
FIG. 6 is a perspective view illustrating the bending apparatus with four coil segments inserted in a left receiving member and a right receiving member.

As illustrated in FIG. 6, the four coil segments 4 are held and conveyed by a conveying device (not shown) and are inserted into the left receiving member 14 and the right receiving member 15 from above. As this occurs, since the upper first die 11 and the upper second die 12 are located in the withdrawal position, the upper first die 11 and the upper second die 12 never interrupt the insertion of the four coil segments 4. In FIGS. 6 to 9, the holding die 31 is omitted from illustration.

Next, the control unit 20 drives the front first moving mechanism 24 and the front second moving mechanism 25 to move the front first die 16 and the front second die 17 upwards and brings rear surfaces of the front first die 16 and the front second die 17 into abutment with the front surfaces of the four coil segments 4.

[Moving Step to Corresponding Position]

Figure 7:
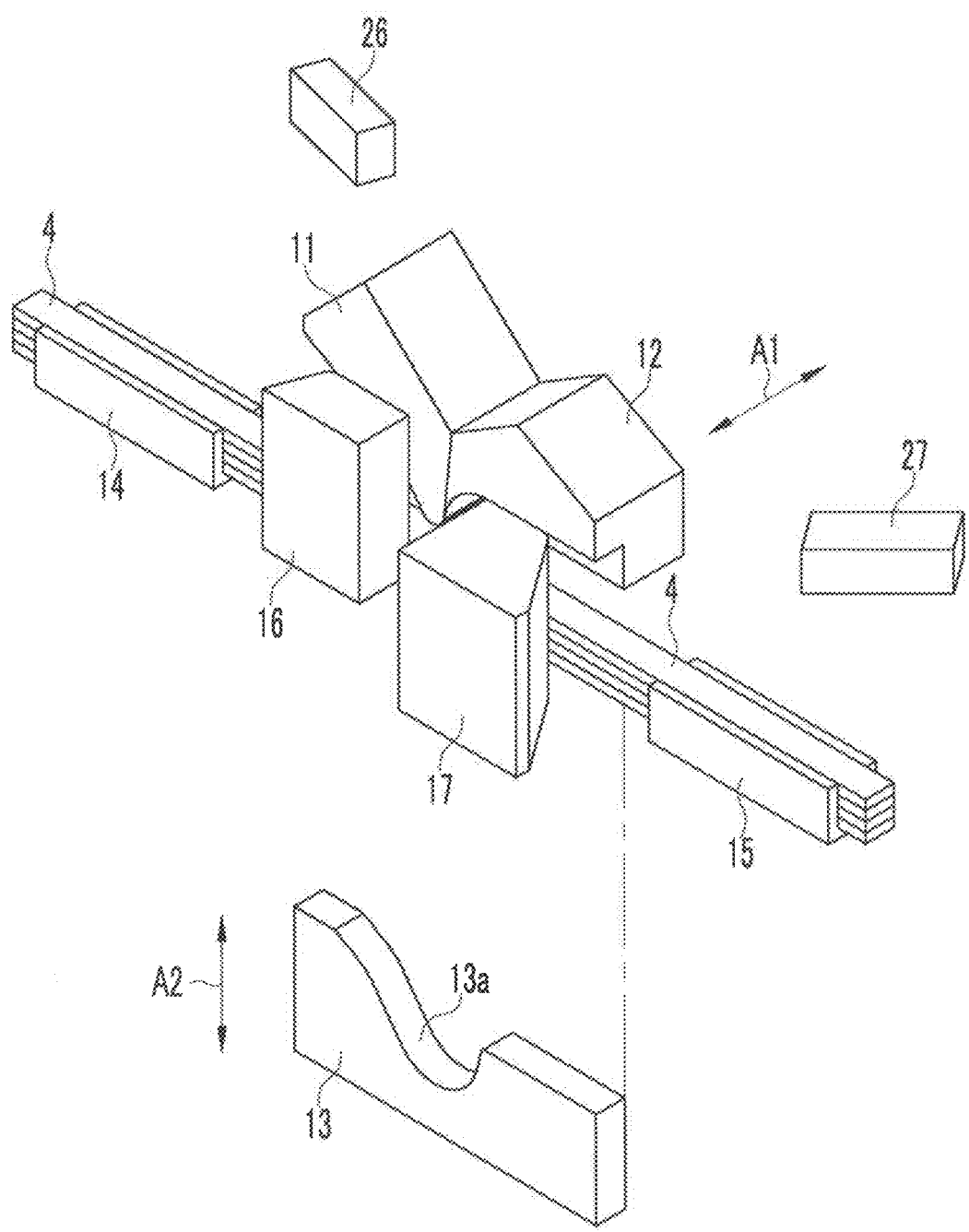
FIG. 7 is a perspective view illustrating the bending apparatus with an upper first die and an upper second die moved to a position where the upper first die and the upper second die are located opposite to a lower die.

After moving the front first die 16 and the front second die 17 upwards, the control unit 20 drives the upper first moving mechanism 21 and the upper second moving mechanism 22 and moves the upper first die 11 and the upper second die 12 to the front to position them in the corresponding position where the upper first and second dies correspond in position to the lower die 13, as illustrated in FIG. 7.

[First Bending Step]

Figure 8:
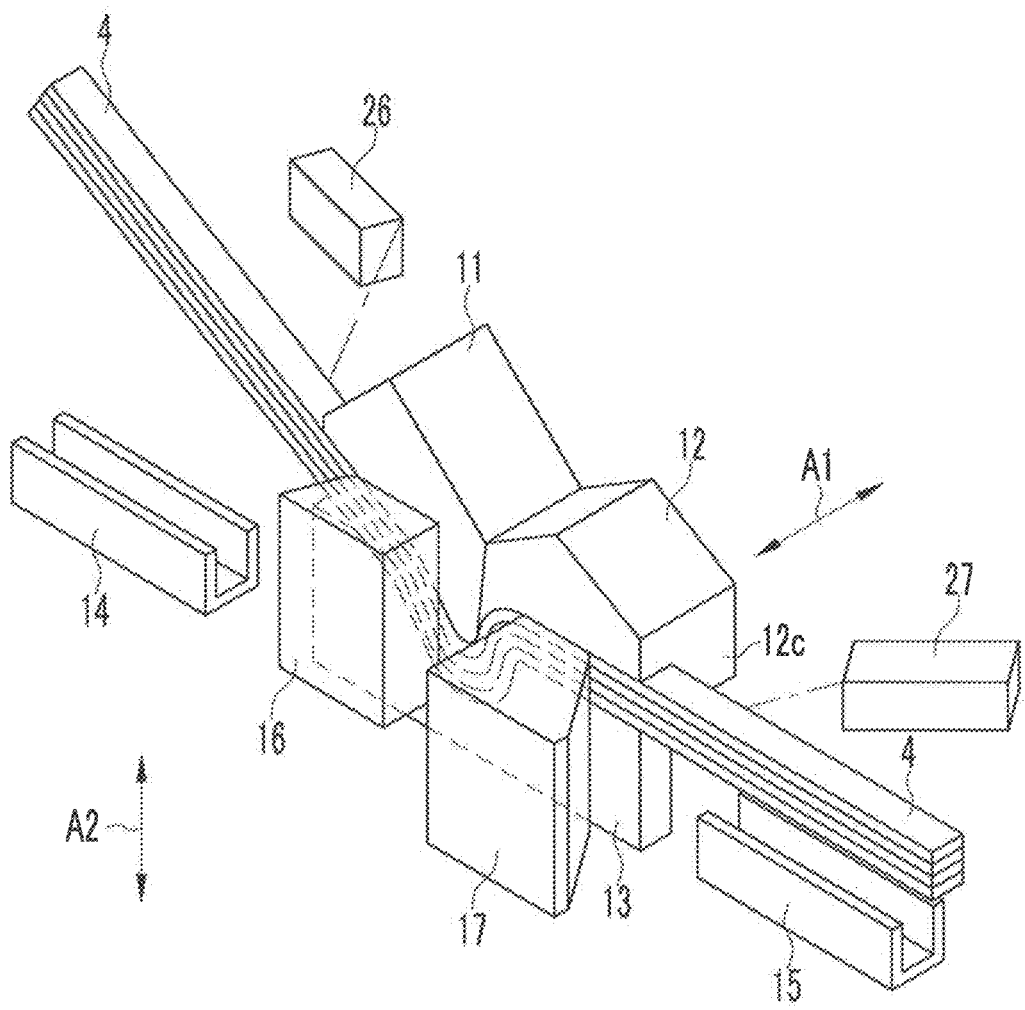
FIG. 8 is a perspective view illustrating the bending apparatus with the four coil segments bent by moving the lower die to a bending position.

Next, as illustrated in FIG. 8, the control unit 20 drives the lower moving mechanism 23 and moves the lower die 13 upwards towards the bending position from the second withdrawal position (refer to FIG. 5). When the lower die 13 moves upwards, an upper surface of the lower die 13 comes into abutment with a lower surface of the lowermost coil segment 4 in the four coil segments 4. When moving the lower die 13 further upwards from this state to the bending position, the four coil segments 4 are held between the upper first die 11 and the upper second die 12, and the lower die 13 and are then bent along a shape defined by the sloping portion 11*a*, the first arc projecting portion 11*b*, the straight-line portion 12*a*, the second arc projecting portion 12*b* and the arc recess portion 13*a* (a bending control).

In the bending apparatus 10, after the four coil segments 4 are bent to be removed out of the left receiving member 14 and the right receiving member 15, the four coil segments 4 are held between the front first die 16 and the front second die 17 and the first holding portion 11*c* of the upper first die 11 and a second holding portion 12*c* of the upper second die 12 and are then positioned in place.

When the bending work is performed in the bending apparatus 10 as described above, there may be an occasion where an obliquely downward bending load is applied to the upper second die 12. In this embodiment, the upper projecting portion 12*d* of the upper second die 12 is formed into the angular shape (the triangular shape) of which the left and right lateral surfaces extend in the sloping direction with respect to the upward direction. This allows either of the left and right lateral surfaces of the upper projecting portion 12*d* to bear the bending load even when the bending load is applied to the upper second die 12, and therefore, the upper second die 12 can bear the bending load when compared with a case where the upper second die 12 has a flat upper surface.

[Second Bending Step]

Figure 9:
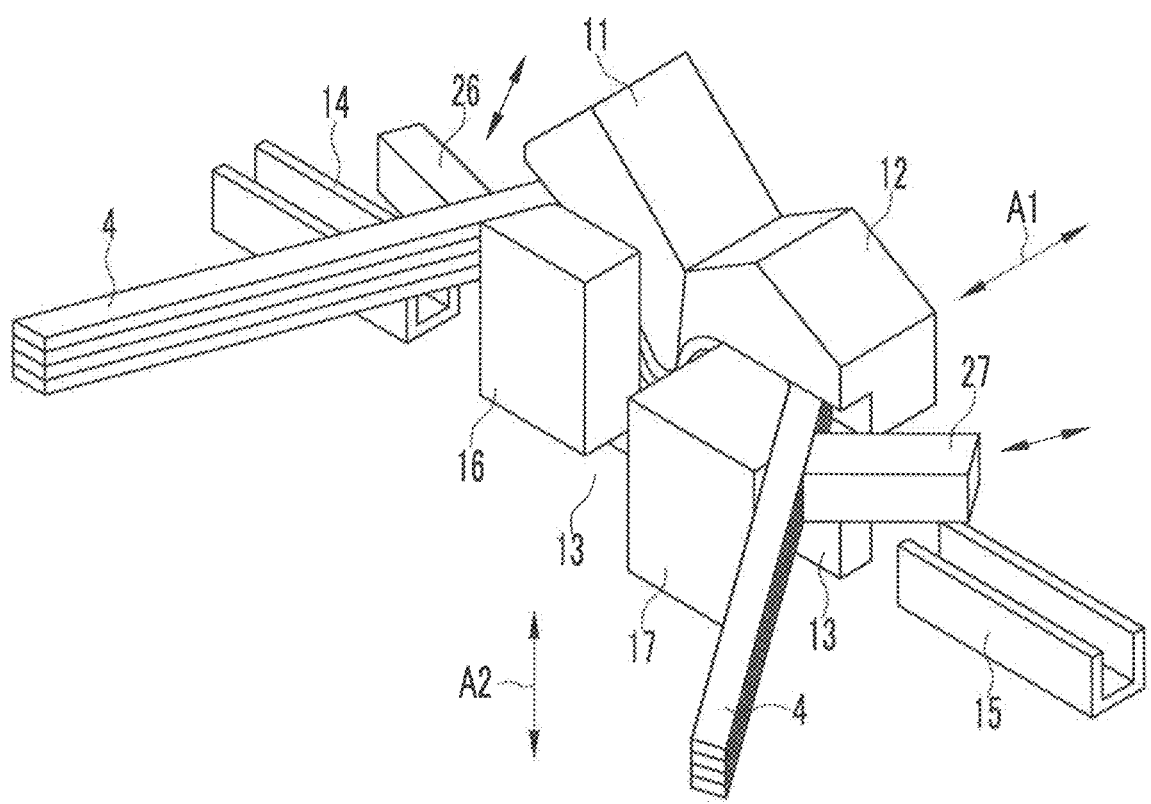
FIG. 9 is a perspective view illustrating the bending apparatus with left and right end portions of the four coil segments bent forwards by moving a left die and a right die obliquely forwards.

Next, as illustrated in FIG. 9, the control unit 20 drives the left moving mechanism 28 and the right moving mechanism 29 and moves the left die 26 and the right die 27 obliquely to the front from their initial positions (refer to FIG. 5) to bend left and right end portions, that is, the left-side and right-side portions of the four coil segments 4 to the front.

[Moving Step to Withdrawal Position]

Figure 10:
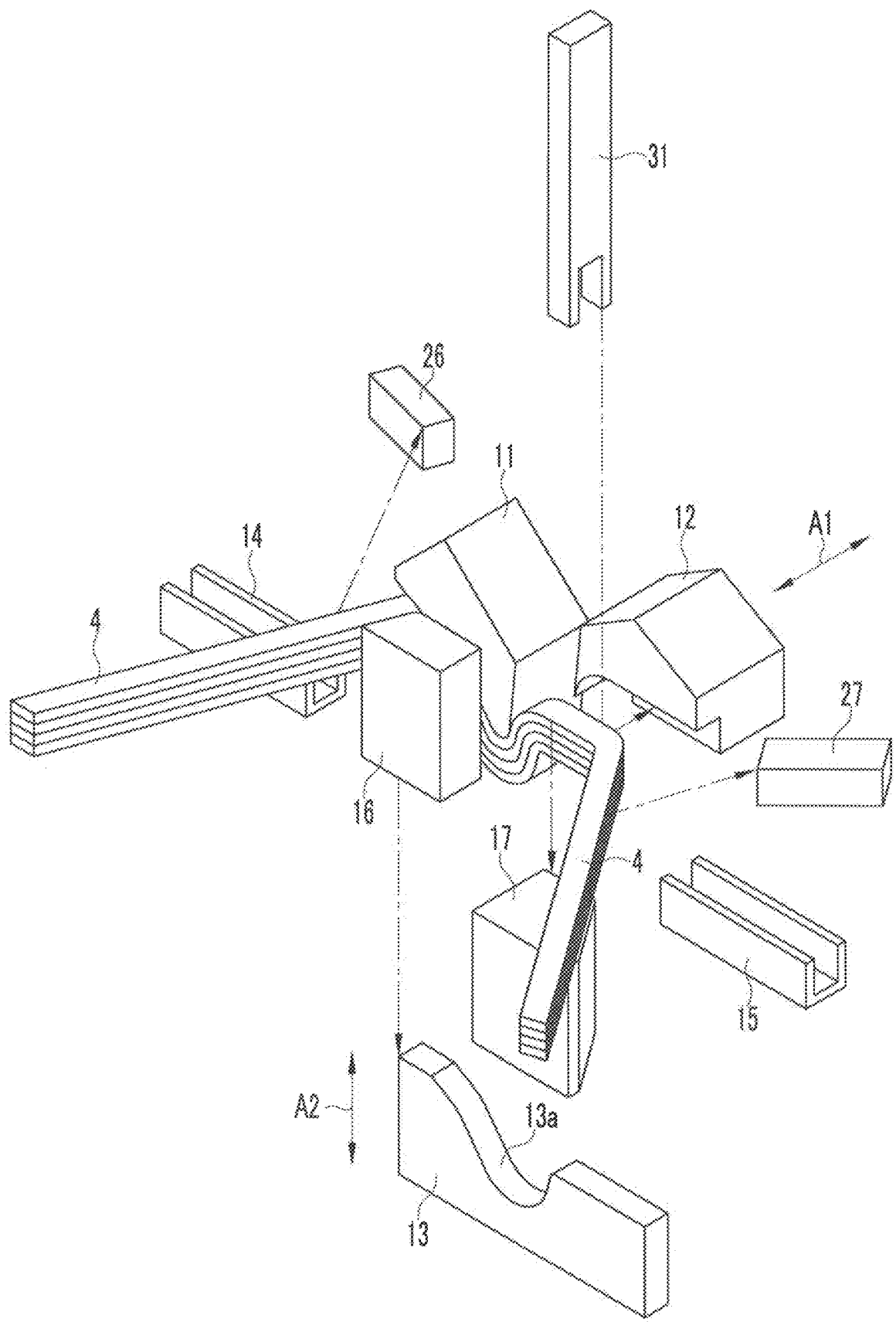
FIG. 10 is a perspective view illustrating the bending apparatus with the upper second die withdrawn.

After the left and right end portions of the four coil segments 4 are bent to the front, as illustrated in FIG. 10, the control unit 20 drives the upper second moving mechanism 22 to move the upper second die 12 to the rear, whereby the upper second die 12 is located in the first withdrawal position.

The control unit 20 also drives the lower moving mechanism 23, the front second moving mechanism 25, the left moving mechanism 28, and the right moving mechanism 29 to move the lower die 13, the front second die 17, the left die 26 and the right die 27, respectively, to their initial positions. This allows a space above the right-side portion of the four coil segments 4 to be ensured as a working space for the holding die 31, which will be described later.

In this embodiment, even after the upper second die 12 is moved to the first withdrawal position, the upper first die 11 is kept holding the four coil segments 4 between the lower die 13 and itself, whereby the four coil segments 4 are positioned in place.

Figure 11:
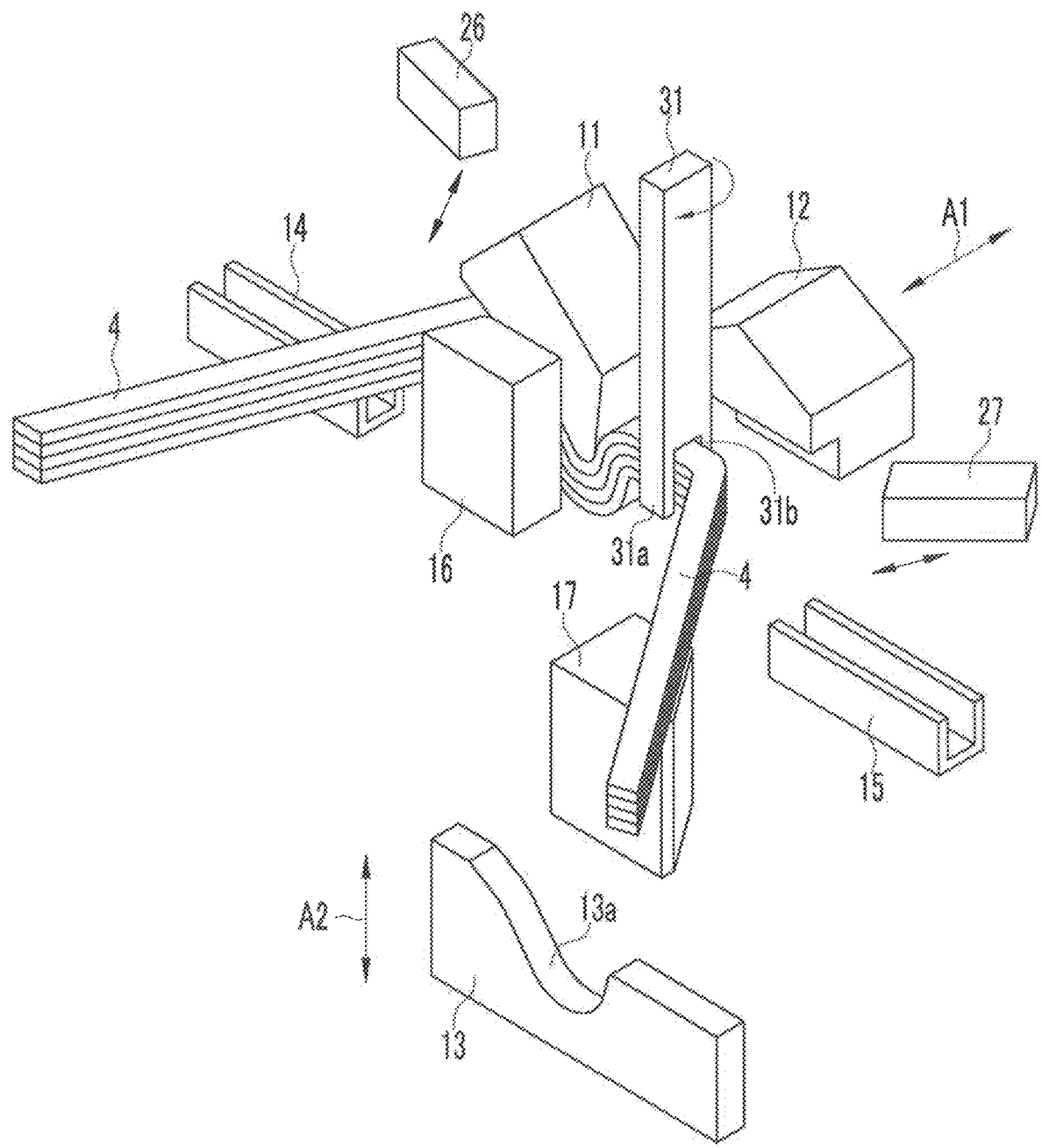
FIG. 11 is a perspective view illustrating the bending apparatus with the four coil segments held by a holding die.

Next, as illustrated in FIG. 11, the control unit 20 drives the moving and rotating mechanism 32 to move the holding die 31 downwards, so that the right-side portion of the four coil segments 4 are inserted between the first holding portion 31*a* and the second holding portion 31*b* to be held in place therebetween.

[Third Bending Step]

Figure 12:
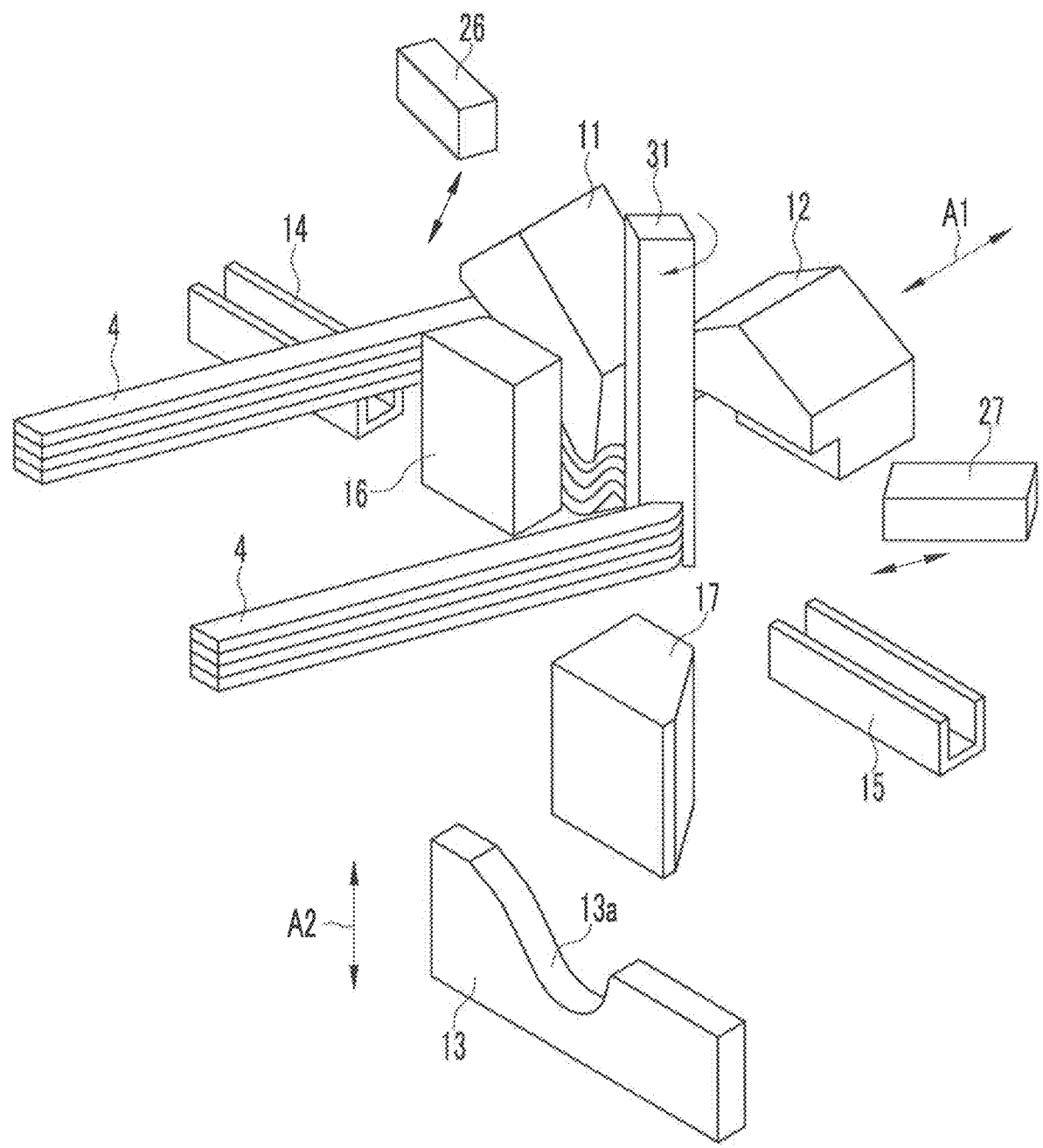
FIG. 12 is a perspective view illustrating the bending apparatus with the four coil segments bent by the holding die.

After the right-side portion of the four coil segments 4 are held by the holding die 31, as illustrated in FIG. 12, the control unit 20 drives the moving and rotating mechanism 32 to rotate the holding die 31 in a clockwise direction. This allows the right-side portion of the four coil segments 4 held between the first holding portion 31*a* and the second holding portion 31*b* to be bent to the front, whereby the four coil segments 4 are bend into the shape illustrated in FIG. 3. The second bending step and the third bending step may be configured so as not to be performed.

In this embodiment, the four coil segments 4 are each bent into the U-shape having the pair of leg portions 4*a* and the head portion 4*b* which connects the pair of leg portions 4*a* together by performing the second bending step. Additionally, the S-shaped portion 4*c* is formed at the center of the head portion 4*b* by performing the first bending step and the third bending step. Thus, the coil segment 4 having the shape illustrated in FIG. 3 is formed for use in the stator 1 of the electric rotary machine.

After the four coil segments 4 are bent, the control unit 20 drives the upper first moving mechanism 21, the front first moving mechanism 24 and the moving and rotating mechanism 32 to move the upper first die 11, the front first die 16, and the holding die 31, respectively, to their initial positions (refer to FIG. 5). Thereafter, the four coil segments 4 which are so bent are removed from the bending apparatus 10.

In this way, since the upper second die 12 can move in the front-and-rear direction A1, the bending work operating space for the holding die 31 can be ensured only by withdrawing the upper second die 12 to the rear. This can reduce a moving distance over which the upper second die 12 is withdrawn when compared with a case where the bending work operating space for the holding die 31 is ensured by withdrawing the upper second die 12 obliquely upwards, whereby the bending apparatus 10 can be made smaller in size.

In the embodiment, although the upper second die 12 is moved in the front-and-rear direction A1, the present invention is not limited thereto, and the upper second die 12 should be moved in a direction parallel to the upper surface of the coil segment 4. Hence, the upper second die 12 may be moved obliquely to the front or obliquely to the rear.

In the embodiment, although the four coil segments 4 are bent together, the present invention can also be applied to a bending apparatus configured to bend one to three coil segments 4 or four or more coil segments 4. The application of the present invention is not limited to the bending apparatus configured to bend the coil segments 4, and hence, the present invention can be applied to any bending apparatus configured to bend an elongated electric conductor.

In the embodiment, although the upper first die 11 and the upper second die 12 are provided as the separate members, the upper first die 11 and the upper second die 12 may be provide integrally with each other.

REFERENCE SIGNS LIST

1 Stator
2 Stator Core
2a Slot
2b Slit
3 Coil
4 Coil Segment (Electric Conductor)
4a Leg Portion
4b Head Portion
4d Projecting Portion
10 Bending Apparatus
11 Upper First Die (Upper Positioning Die)
12 Upper Second Die (Upper Die)
12d Upper Projecting Portion
13 Lower Die
20 Control Unit
22 Upper Second Moving Mechanism (Upper Moving Mechanism)
23 Lower Moving Mechanism
26 Left Die (End Portion Bending Die)
27 Right Die (End Portion Bending Die)
31 Holding Die (Upper Bending Die)
A1 Front-and-Rear Direction (Direction Parallel to Upper Surface of Electric Conductor)
A2 Up-and-Down Direction

What is claimed is:

1. An electric conductor bending apparatus for bending an elongated electric conductor on a longitudinal lateral surface, comprising:
   an upper die provided to move in a direction parallel to an upper surface of the electric conductor above the electric conductor;
   a lower die provided to move in an up-and-down direction parallel to the lateral surface below the electric conductor and, when moved in the up direction, configured to contact a bottom surface of the electric conductor to hold the electric conductor between the upper die and the lower die so that the upper die and the lower die bend the electric conductor;
   an upper moving mechanism configured to move the upper die in the direction parallel to the upper surface of the electric conductor between an opposing position where the upper die opposes the lower die and a first withdrawal position where the upper die does not oppose the lower die;
   a lower moving mechanism configured to move the lower die in the up-and-down direction between a bending position where the lower die holds the electric conductor between the upper die located in the opposing position and the lower die to bend the electric conductor and a second withdrawal position where the lower die is withdrawn downwards from the bending position; and
   a control unit configured to control to drive the upper moving mechanism and the lower moving mechanism,
   wherein the control unit executes a bending control in which with the upper die located in the opposing position, the control unit drives the lower moving mechanism to move the lower die from the second withdrawal position to the bending position where the electric conductor is held between the upper die and the lower die to be bent,
   wherein the electric conductor bending apparatus further comprises a front first die and a front second die, and when the control unit is executing bending control, front first and front second moving mechanisms are configured to move the front first die and the front second die to contact the lateral surfaces of the electric conductor from a front-back direction of the electric conductor to hold opposite lateral surfaces of the electric conductor between the upper die and the front first die and the front second die, and
   wherein the electric conductor bending apparatus further comprises: an end portion bending die provided to move in the direction parallel to the upper surface of the electric conductor and configured to bend both end portions of the electric conductor on a plane parallel to the upper surface of the electric conductor; and a holding die provided to move in the up-and-down direction above the electric conductor and configured to bend a predetermined portion of the electric conductor which is covered by the upper die when the upper die is located in the opposing position.

2. The electric conductor bending apparatus according to claim 1,
   wherein a plurality of the electric conductors are bent altogether at one time by the upper die and the lower die.

3. The electric conductor bending apparatus according to claim 1, further comprising:
   a positioning die wherein the upper moving mechanism is configured to move the positioning die to be brought into abutment with the upper surface of the electric conductor to position the electric conductor.

4. The electric conductor bending apparatus according to claim 1,
   wherein an upper surface of the upper die has an upper projecting portion, the upper projecting portion projecting in a sloping direction with respect to an upward direction.

5. An electric conductor bending method for bending an elongated electric conductor by holding the electric conductor between an upper die provided to move in a direction parallel to an upper surface of the electric conductor above the electric conductor, a lower die provided to move in an up-and-down direction parallel to a longitudinal lateral surface of the electric conductor below the electric conductor, a front first die, a front second die, an end portion bending die, and a holding die, the electric conductor bending method comprising:

a step of moving to an opposing position of moving the upper die to the opposing position where the upper die opposes the lower die;

a step of lateral surface contact of contacting a lateral surface of the electric conductor from a front-back direction of the electric conductor with the front first die and the front second die to hold opposite lateral surfaces of the electric conductor between the upper die and the front first die and the front second die;

a first bending step of moving the lower die to a bending position where the lower die contacts a bottom surface of the electric conductor and holds the electric conductor between the upper die located in the opposing position and the lower die so that the upper die and the lower die bend the electric conductor, the first bending step being executed after the step of moving to the opposing position and the step of lateral surface contact;

a second bending step of bending both end portions of the electric conductor on a plane parallel to the upper surface of the electric conductor by the end portion bending die provided to move in the direction parallel to the upper surface of the electric conductor, the second bending step being executed between the first bending step and the step of moving to the withdrawal position;

a step of moving to a withdrawal position of moving the upper die to the withdrawal position where the upper die does not oppose the lower die, the step of moving to the withdrawal position being executed after the first bending step; and a third bending step of bending a predetermined portion of the electric conductor which is covered by the upper die when the upper die is located in the opposing position by the holding die provided to move in the up-and-down direction above the electric conductor, the third bending step being executed after the step of moving to the withdrawal position.

6. The electric conductor bending method according to claim 5, wherein a plurality of the electric conductors are bent altogether at one time.

7. The electric conductor bending method according to claim 5, wherein the upper surface of the electric conductor is positioned by a separate positioning die from the upper die.

\* \* \* \* \*